United States Patent
Klein et al.

(10) Patent No.: US 12,216,514 B1
(45) Date of Patent: Feb. 4, 2025

(54) DYNAMIC HARDWARE CARD THERMAL ADAPTATION

(71) Applicant: Amazon Technologies, Inc., Seattle, WA (US)

(72) Inventors: Robert Klein, Kfar Tavor (IL); Ziv Harel, Megido (IL)

(73) Assignee: Amazon Technologies, Inc., Seattle, WA (US)

( * ) Notice: Subject to any disclaimer, the term of this patent is extended or adjusted under 35 U.S.C. 154(b) by 553 days.

(21) Appl. No.: 17/548,376

(22) Filed: Dec. 10, 2021

(51) Int. Cl.
   *G06F 1/20* (2006.01)
   *G05B 19/4155* (2006.01)

(52) U.S. Cl.
   CPC .......... *G06F 1/20* (2013.01); *G05B 19/4155* (2013.01); *G05B 2219/49216* (2013.01); *G06F 1/206* (2013.01)

(58) Field of Classification Search
   CPC . G06F 1/185; G06F 1/186; G06F 1/20; G06F 1/206; G05B 2219/49216; G05B 19/4155
   See application file for complete search history.

(56) References Cited

U.S. PATENT DOCUMENTS

| | | | |
|---|---|---|---|
| 8,650,369 B1 | 2/2014 | Corddry et al. | |
| 9,671,840 B2 | 6/2017 | Haridass et al. | |
| 10,353,446 B2 | 7/2019 | Lovicott et al. | |
| 11,709,522 B1* | 7/2023 | Turullols | G06F 1/3206 713/340 |
| 2007/0109725 A1* | 5/2007 | Lindell | H05K 7/20836 361/600 |
| 2014/0326442 A1* | 11/2014 | Kurpiewski | G06F 1/206 165/287 |
| 2016/0092335 A1* | 3/2016 | Boelter | G06F 13/00 714/47.1 |
| 2017/0017281 A1 | 1/2017 | Artman et al. | |
| 2018/0004787 A1* | 1/2018 | Kunnathur Ragupathi | G06F 16/2282 |
| 2018/0164841 A1* | 6/2018 | Lovicott | G06F 1/206 |
| 2018/0267582 A1* | 9/2018 | Woo | G05D 13/62 |
| 2021/0397231 A1* | 12/2021 | Toyoda | G05B 15/02 |

* cited by examiner

*Primary Examiner* — Daniel Samwel
(74) *Attorney, Agent, or Firm* — Alexander A. Knapp; Kowert, Hood, Munyon, Rankin & Goetzel, P.C.

(57) ABSTRACT

A hardware card that can be implemented in a server system is disclosed. The hardware card may be, for instance, a network interface card coupled to a board such as a motherboard or backplane in a computing system. In various instances, the hardware card reports a temperature to a management controller on the board (e.g., a baseboard management controller) that is adjusted due to thermal degradation of the hardware card. For example, the temperature output by the hardware card may be adjusted based on a comparison of a current temperature profile (including transient temperature of the hardware card) to a predetermined temperature profile stored on the hardware card.

20 Claims, 8 Drawing Sheets

DYNAMIC HARDWARE CARD THERMAL ADAPTATION

BACKGROUND

Organizations such as on-line retailers, Internet service providers, search providers, financial institutions, universities, and other computing-intensive organizations often conduct computer operations from large scale computing facilities. Such computing facilities house and accommodate a large amount of server, network, and computer equipment to process, store, and exchange data as needed to carry out an organization's operations. Typically, a computer room of a computing facility includes many server racks. Each server rack, in turn, includes many servers and associated computer equipment.

Computer systems typically include a number of components, such components include printed circuit boards, mass storage devices, power supplies, and processors. Some known computer systems include a plurality of large, multiple-processor computers that are configured into rack-mounted components, and then are subsequently positioned within a rack system. With the large number of components in these systems, there is a possibility for thermal degradation of components due to the large amount of heat generated in the systems and aging of components and materials. Thermal degradation can lead to failure of components. Without proper monitoring and control of temperatures in these systems, unexpected failures can occur that lead to undesirable downtimes that can affect customer usage or lead to customer dissatisfaction with the system.

Figure 1:
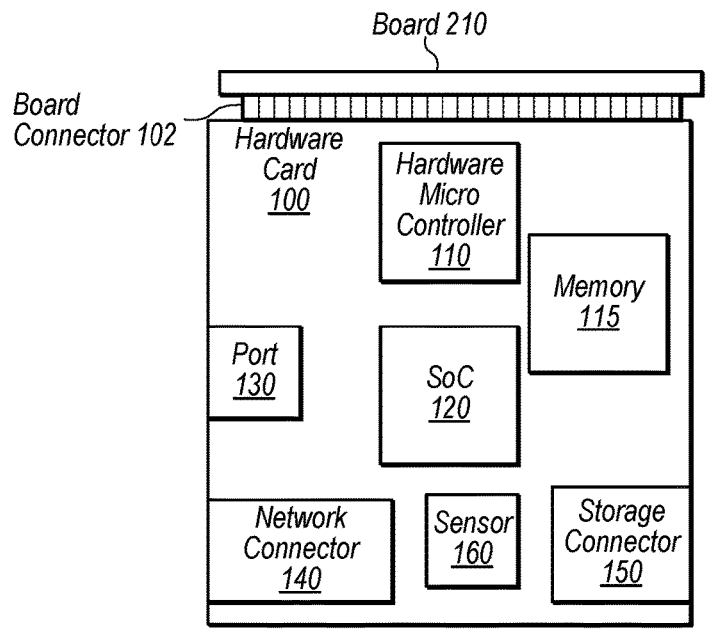
FIG. 1 depicts a block diagram of an example embodiment of a hardware card.

The various embodiments described herein are susceptible to various modifications and alternative forms. Specific embodiments are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of computer systems, and systems and methods for performing computing operations and data storage operations, are disclosed. According to some embodiments, a computing system includes a rack and a server system coupled to the rack. The server system may include a chassis and an array of devices mounted within the chassis of the server system. The array of devices includes, for example, mass storage devices (such as hard disk drives or solid state drives), CPUs, and hardware cards (such as PCIe network cards or other network interface cards). These devices may be mounted in the array of devices using various known techniques. For instance, these devices may be mounted to boards (e.g., motherboards) or backplanes in the server system. In certain embodiments, the array includes various service devices mounted in the array. Examples of service devices include management controllers (such as baseboard management controllers (BMCs)) or other devices that control operations for the devices in the array or provide communication operations for devices in the array. Communication operations may include communications between devices in the array or communications with other systems to provide, for example, read/write access to data stored on the mass storage devices.

According to some embodiments, a server system includes a board (e.g., a motherboard) with one or more hardware cards coupled to the board. A fan is coupled to the hardware card to provide cooling for the card via circulation of air across components on the card generating heat. A temperature sensor measures a temperature of the hardware card. In certain embodiments, the hardware card is configured to output an adjusted temperature determined from the temperature measured by the temperature sensor. For instance, the temperature measured by the temperature sensor may be adjusted according to a predetermined temperature profile stored on the hardware card. The predetermined temperature profile may include an operating temperature of the hardware card and a transient temperature property of the hardware card. An example predetermined temperature profile is provided below with respect to the description of FIG. 6. The hardware card may adjust the sensed temperature based on comparison of current temperature properties (e.g., operating temperature and transient temperature) to the predetermined temperature profile and output the adjusted temperature in a standard temperature format (e.g., a temperature format that is card agnostic).

In some embodiments, the predetermined temperature profile is determined from testing (e.g., stress testing) of the hardware card. The predetermined temperature profile may then be stored (e.g., burned) in the hardware card before deployment (e.g., shipping and installation) of the hardware card. In various embodiments, a management controller receives the adjusted temperature from the hardware card and determines a speed of the fan based on the adjusted temperature. In certain embodiments, the management controller is unaware of any adjustment made to the temperature output by the hardware card. Accordingly, the management controller controls the fan speed based on the adjusted output provided by the hardware card itself without any adjustments for performance degradation needing to be determined by the management controller.

As used herein, "hardware card" refers to any card, board, or adapter that includes hardware circuitry and/or hardware components providing additional operational capabilities for a device to which the hardware circuitry is coupled. For instance, hardware cards may be coupled to devices such as motherboards or backplanes. In certain embodiments described herein, hardware cards include processor components such as a microcontroller or an SoC. In various embodiments, a hardware card is coupled to devices via an interface element such as, but not limited to, a slot (e.g., an expansion slot), an electrical connector, a port (e.g., an expansion port), a cable, a riser, or an adapter. Examples of additional operational capabilities provided by hardware cards include, but are not limited to, communication (e.g., networking) capabilities, memory capabilities, disk controller capabilities, coprocessing capabilities, and graphics capabilities. For instance, in one contemplated embodiment, a hardware card may be a virtualization offloading card (e.g., a "smart network interface card") that performs or manages virtualization operations (e.g., networking and routing of traffic from servers) for computing instances implemented by processors (e.g., SoCs, CPUs, or GPUs) coupled to the board. In another contemplated embodiment, a hardware card is a server device for a storage node (e.g., a set of mass storage devices). In such an embodiment, the server device is configured to control storage operations for the mass storage devices in the array and includes a network port for communicating with other systems.

As used herein, "backplane" means a plate or board to which other electronic components, such as interposer cards and mass storage devices, etc. can be mounted. In some embodiments, mass storage devices, which can include one or more hard disk drives, are plugged into a backplane, via an interposer card, in a generally perpendicular orientation relative to the face of the backplane. In some embodiments, a virtualization offloading card is plugged into a backplane in a generally perpendicular orientation relative to the face of the backplane. In some embodiments, a backplane includes one or more power buses that can transmit power to components on the backplane, and one or more data buses that can transmit data to and from components installed on the backplane. Also, in some embodiments a backplane may include an application specific integrated circuit (ASIC) configured to provide Ethernet switching for components mounted on the backplane.

As used herein, a "cable" includes any cable, conduit, or line that carries one or more conductors and that is flexible over at least a portion of its length. A cable may include a connector portion, such as a plug, at one or more of its ends.

As used herein, "circuit board" means any board or plate that has one or more electrical conductors transmitting power, data, or signals from components on or coupled to the circuit board to other components on the board or to external components. In certain embodiments, a circuit board is an epoxy glass board with one or more conductive layers therein. A circuit board may, however, be made of any suitable combination of materials.

As used herein, "chassis" means a structure or element that supports another element or to which other elements can be mounted. A chassis may have any shape or construction, including a frame, a sheet, a plate, a box, a channel, or a combination thereof. In one embodiment, a chassis is made from one or more sheet metal parts. A chassis for a computer system may support circuit board assemblies, power supply units, data storage devices, fans, cables, and other components of the computer system.

As used herein, "computing" includes any operations that can be performed by a computer, such as computation, data storage, data retrieval, or communications.

As used herein, "data center" includes any facility or portion of a facility in which computer operations are carried out. A data center may include servers dedicated to specific functions or serving multiple functions. Examples of computer operations include information processing, communications, testing, simulations, power distribution and control, and operational control.

As used herein, "mounting" a particular element on another element refers to positioning the particular element to be in physical contact with the other element, such that the other element provides one or more of structural support, positioning, structural load transfer, stabilization, shock absorption, some combination thereof, or the like with regard to the particular element. The mounted particular element may be positioned to rest upon one or more upper surfaces of the other element, independent of coupling the elements via one or more coupling elements. In some embodiments, mounting the particular element to another element includes coupling the elements such that the other element provides one or more of structural support, positioning, structural load transfer, stabilization, shock absorption, some combination thereof, or the like with regard to the particular element.

As used herein, a "rack" means a rack, container, frame, or other element or combination of elements that can contain or physically support one or more computer systems.

As used herein, a "standard temperature format" refers to a temperature format that is common or generic among a group of hardware cards. For instance, a standard temperature format may be a "hardware card-agnostic" temperature format where a group of hardware cards all output a temperature signal in the same format. By providing temperature signal outputs in the standard temperature format, a device (such as a management controller) receiving the temperature signal may be unaware of any adjustments to the temperature made by the hardware device.

Hardware cards, like most electrical components, are subject to decreased performance due to aging or other factors. For example, heat sinks can become loose or drop and thermal interface materials may become dry and create gaps between components, resulting in degradation in the thermal performance of the hardware card. The degradation in thermal performance often results in the hardware card not being able to dissipate the heat the card generates, potentially causing overheating of the hardware card beyond the limits of its working conditions. Above these limits, the hardware card performance can become unstable and possibly lead to permanent damage of the hardware card. To compensate for the increased temperature, the server system may increase cooling of the server (e.g., by increasing fan speed), which can shorten the lifetime of the fans and can significantly increase power consumption and increase operating costs.

Eventually, the hardware card's thermal performance will become poor enough that the hardware card needs to be replaced to avoid negative impacts to customers. If, however, the card is not replaced in time, the card could show instability (e.g., increased error rate or erratic behavior) or shut down (e.g., when thermal protection for overtemperatures on the card are implemented). This shut down can directly impact the customer by, for example, hanging service or dropping service entirely. Thus, it would be beneficial to replace hardware cards before the thermal degradation reaches the point where it adversely affects the customer experience. Current monitoring systems, however, can be limited in that the systems may only monitor the steady state performance of the hardware card even though properties of the hardware card (such as power and performance) are dynamic properties.

Server systems with multiple hardware cards and components also often rely on "worst case scenarios" for control of cooling the systems. For instance, high-performance components may heat up faster than a combined response time of the cooling system that includes sampling the temperature and responding to the temperature by changing speeds of the fans. The components heating faster than the cooling system can respond may lead to overheating of the components and the possibility of instability or shutdown of the components. One complex solution to this problem is to design the cooling system to cope with such thermal changes by implementing a cooling "buffer" that overcools the high-performance components. The amount (e.g., percentage) of overcooling would have to take into advance account the worst case gradient over a large population of components that is a superset of the impact of power related variations such as hardware variations. Designing such systems for these "worst case scenarios" may lead to overcooling that impacts the overall operation cost of the cooling system.

FIG. 1 depicts a block diagram of an example embodiment of a hardware card. In the illustrated embodiment, hardware card 100 includes hardware microcontroller 110, memory 115, and SoC 120. In various embodiments, hardware card 100 includes any number of hardware microcontrollers 110 and/or SoCs 120. In certain embodiments, hardware card 100 includes board connector 102 that connects the hardware card to board 210 (e.g., a printed circuit board such as a motherboard or a backplane, as described below). In some embodiments, board connector 102 include connectors for power and multi-pin connectors though other types of connectors may be used. In addition, hardware card 100 includes any number of ports 130, network connectors 140, and storage connectors 150.

In various embodiments, hardware card 100 is a virtualization offloading card capable of offloading some of the work required to configure and manage compute instances running at a computer system associated with board 210. The offloading enables a larger fraction of the computing and other resources of the computer system to be utilized for the compute instances and client applications running at the compute instances. In the embodiment depicted in FIG. 1, code and data of a number of virtualization management component programs (e.g., software and/or firmware) may be stored locally on memory 115 of hardware card 100 or at storage devices connected via storage connector 150. The code and data may be run using the SoC 120.

In some embodiments, port 130 or network connector 140 may connect circuitry of the hardware card to a system management processor (e.g., a baseboard management controller (BMC), as described herein). The system management processor may be responsible for tasks such as monitoring the physical state of the server system, providing results of such monitoring, rebooting/restarting of the server system when needed, controlling cooling (e.g., fan speeds) in the server system, and so on. In some embodiments, network connector 140 may be used to access a substrate network of a cloud computing service or another computing service in at least some embodiments.

Memory 115 may include one or more types of local persistent storage devices such as NVME (non-volatile memory express) device(s). In some embodiments, storage manager code running at hardware card 100 (e.g., in hardware microcontroller 110 or SoC 120) may use memory 115. For instance, as described herein, memory 115 may store operating parameter (e.g., temperature) profiles that are accessed during operation of hardware card 100.

In certain embodiments, hardware card 100 includes one or more sensors 160. Sensors 160 may be, for example, temperature sensors. Other sensors may also be implemented that measure other operating parameters of hardware card 100. For example, sensors 160 may function to measure voltage or power of hardware card 100.

Figure 2:
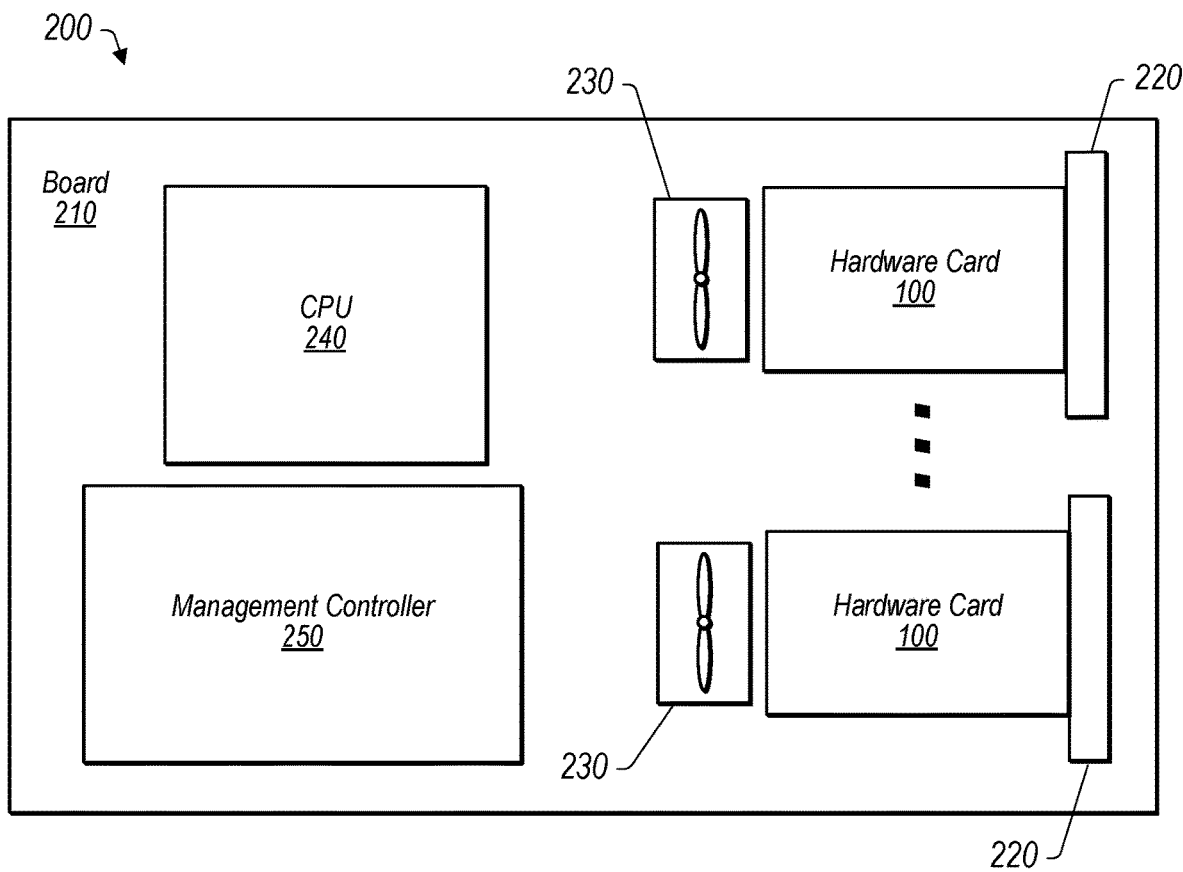
FIG. 2 depicts a block diagram of a server system, according to some embodiments.

FIG. 2 depicts a block diagram of a server system, according to some embodiments. In certain embodiments, server system 200 is implemented in a data center or another computing system. In the illustrated embodiment, server system 200 includes board 210. Board 210 may be a printed circuit board such as a motherboard or a backplane. Other types of boards for implementation in a server system may be contemplated.

In certain embodiments, board 210 includes interface elements 220. Interface elements 220 allow for additional components (e.g., hardware cards 100) to be mounted to board 210. Interface elements 220 may be, for example, expansion slots, electrical connectors, expansion ports, cables, risers, or adapters that enable components on board 210 to be coupled to additional components. For instance, in the illustrated embodiment, hardware cards 100 are coupled to interface elements 220. Server system 200 and board 210 may include any number of interface elements 220 and any number of hardware cards 100 may be coupled to the interface elements.

In various embodiments, server system 200 includes fans 230. Fans 230 may be mounted on board 210. In some embodiments, fans 230 are attached to and part of hardware card 100. Accordingly, fans 230 are mounted on board 210 when hardware cards are mounted to interface elements 220. In some embodiments, fans 230 are directly mounted on board 210.

In certain embodiments, server system 200 includes CPU 240 and management controller 250. In some embodiments, CPU 240 and management controller 250 are mounted on board 210. Alternatively, CPU 240 and management controller 250 may be coupled to board 210 or located separately and coupled to components on board 210 (such as hardware cards 100). CPU 240 may be, for example, an SoC. In certain embodiments, management controller 250 is a baseboard management controller (BMC). Management controller 250 may include various ports and connectors for coupling to the various components of server system 200. For example, management controller 250 may include ports or connectors that couple to interface elements 220, fans 230, or hardware cards 100.

In various embodiments, management controller 250 may receive status information or data about connected system management components, such as state information, temperature information, etc. and may remotely control system management components, such as by changing a power state of the system management components or adjusting a control parameter of the system management components, such as a fan speed. In certain embodiments, management controller 250 includes fan speed controller 252. Fan speed controller 252 may control the speed of fans 230 based on temperature outputs received from hardware cards 100, as described herein.

According to some embodiments, hardware cards are periodically tested to determine the health status of the hardware cards. For example, a thermal load check on a hardware card may determine whether a hardware card is operating properly or showing any signs of decreased performance. As described above, typically the thermal load check involves determining a steady state temperature of the hardware card under a specified power load, which is a fixed thermal boundary condition for the hardware card. In various embodiments, the specified power load is a maximum power load for the hardware card.

Only determining the steady state temperature, however, limits the information available for prediction failures of the hardware card and many failure processes remain undetected. To overcome the deficiencies in only determining the steady state temperature, the present disclosure recognizes that additional information can be obtained if the transient performance of the hardware card is assessed during the thermal load check testing. For instance, determining the variation of temperature over time may provide additional information that improves the prediction capability for hardware card decline.

Figure 3:
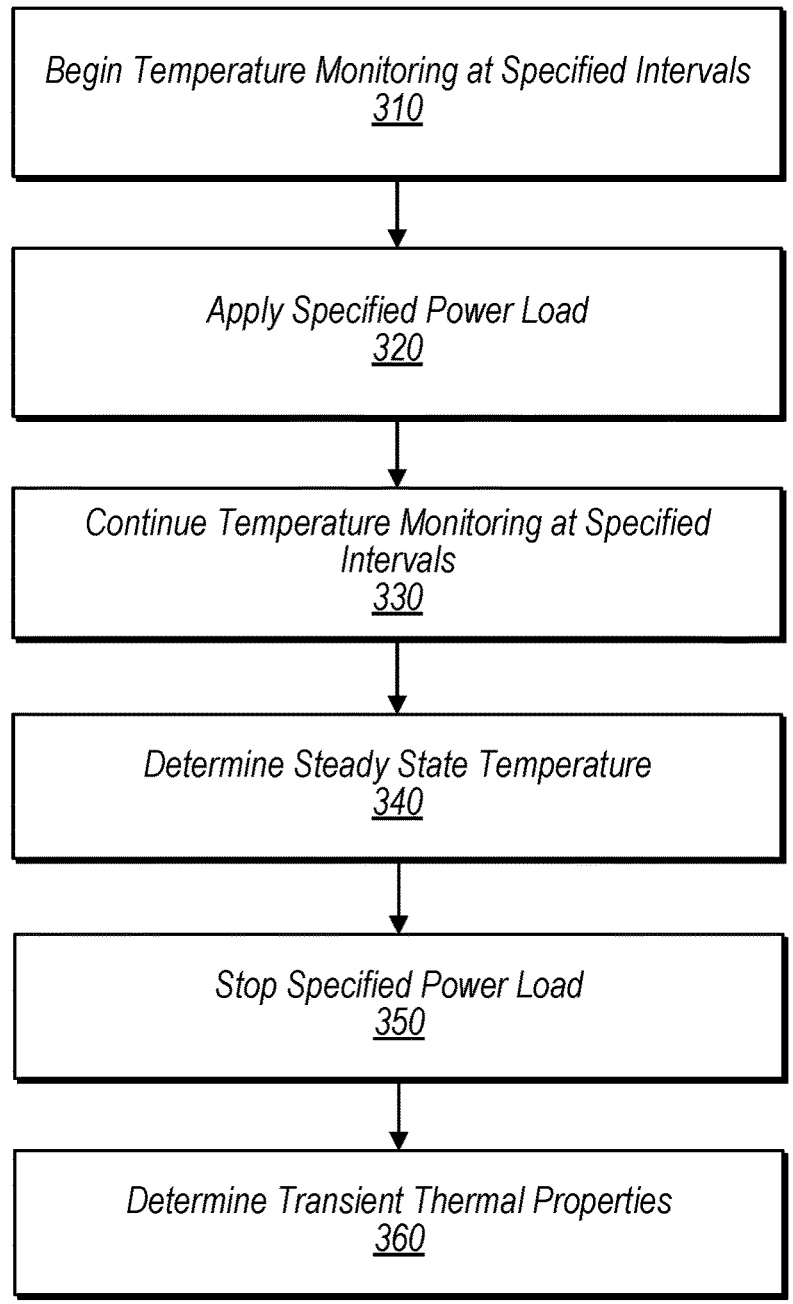
FIG. 3 depicts a flow diagram of a thermal load check test, according to some embodiments.

FIG. 3 depicts a flow diagram of a thermal load check test, according to some embodiments. The thermal load check test 300 may be implemented at different points during the lifetime of a hardware card. For instance, the thermal load check may be implemented during production of the hardware card or during service operation of the hardware card (e.g., while installed in a data center). For during service testing, the thermal load check may be completed during a planned downtime for the hardware card to avoid unwanted interruption of service for customers. In some embodiments, thermal load check test 300 may be implemented on production equivalent hardware cards (e.g., hardware cards produced as a single batch).

In various embodiments, thermal load check test 300 begins with temperature monitoring at specified intervals in 310. In certain embodiments, the temperature is monitored with periodic sub-second sampling. For example, the temperature may be monitored four times a second (e.g., every 0.25 seconds). The temperature may be monitored at faster intervals (e.g., 6 or 8 times a second). Once temperature monitoring has begun, a specified power load is applied to the hardware card in 320. In certain embodiments, the specified power load is a maximum power load for the hardware card. As the specified power load is applied, the temperature is continually measured at the specified interval (e.g., four times a second) in 330.

Figure 4:
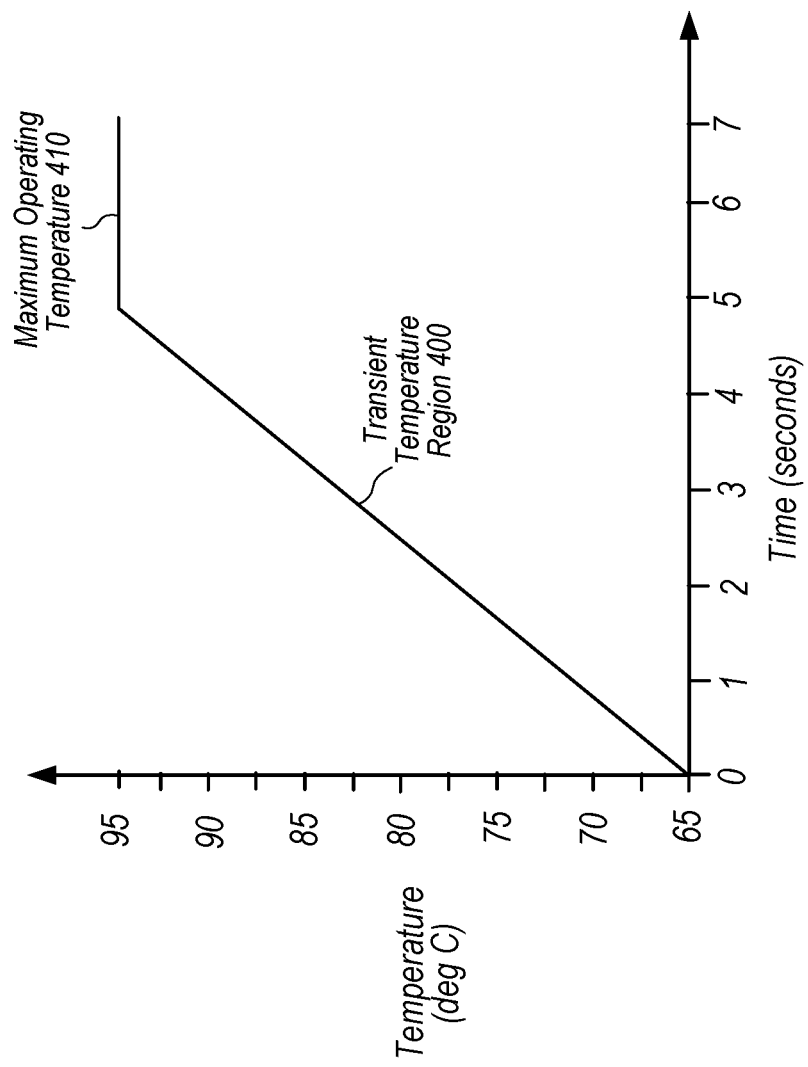
FIG. 4 depicts an example plot of temperature versus time during a thermal load test.

FIG. 4 depicts an example plot of temperature versus time during thermal load test 300. In the example, time 0 is the beginning of thermal load test and the beginning temperature is 65° C. (e.g., a normal operating temperature of a hardware card). At time 0, the specified power load is applied and the temperature increases over time in transient temperature region 400.

Eventually (typically in a matter of seconds), as shown in FIG. 4, the temperature of the hardware card reaches a steady state and the maximum steady state temperature (e.g., maximum operating temperature 410). Turning back to FIG. 3, maximum operating temperature 410 is the steady state temperature determined in 340. After the steady state temperature is determined, the specified power load is turned off in 350. Typically, the temperature is not monitored after the specified power load is turned off but embodiments may be contemplated where the temperature is monitored until the hardware card reaches its initial state (e.g., the temperature before the load was applied as determined in 310).

After completion of the thermal load test (e.g., turning on/off the specified power load), the temperature measurements made at the specified intervals may be assessed to determine transient thermal properties (e.g., transient temperature) for the hardware card in 360. Transient temperature may include, for example, a temperature rise versus time (such as ° C. per second) for the hardware card. Using the plot of FIG. 4 as an example, the transient temperature is 6° C./second as determined by the slope in transient temperature region 400 and the maximum operating temperature is 95° C. The values for the transient temperature and the maximum operating temperature determined during the thermal load test may be implemented in a predetermined temperature profile of a hardware card, as described herein. Transient thermal properties may also include other operating parameters in addition to temperature. For instance, voltage or power versus time across a component on the hardware card may be a transient thermal property. Additionally, voltage or power may have maximum operating points (e.g., maximum voltage or maximum power) for the hardware cards that are part of the predetermined operating parameter profile. Accordingly, the hardware card may output adjustments to voltage or power in addition to adjustments for temperature, as described herein.

In various embodiments, the transient thermal properties determined during the thermal load test provide an indication of benchmark (e.g., baseline) operation of the hardware card. Accordingly, any changes in the transient thermal properties may indicate changes in performance of the hardware card. For example, an increase in the transient temperature property (such as from 6° C./sec (the baseline) to 8° C./sec) may indicate thermal degradation in the hardware card since the temperature increases more quickly over time. Examples of thermal degradation that may be indicated by changes in the transient temperature property include, but are not limited to, hardware issues on the card such as loosened or dropped heat sink, dry thermal interface materials, card SoC corner cases such as fast silicon with aggressive temperature changes, and server hardware issues causing cooling problems (such as broken fans, non-responsive fan speed control, poor cooling control, etc.).

The assessment of the changes in transient temperature property (or other transient properties) may be combined with assessment of any changes (or no changes) in the steady state temperature of the hardware card to provide a prediction of thermal performance (either good or bad) of the hardware card. Including the transient temperature property in the prediction provides a more accurate assessment of the thermal performance of the hardware card. Accordingly, in certain embodiments, hardware cards may be screened for removal or maintenance based on the prediction made from the thermal load test. In some embodiments, the prediction for thermal performance of the hardware card may be a levelled prediction. For instance, a larger change in the transient temperature property may be indicative of more serious degradation in the hardware card and the hardware card may be flagged for immediate replacement or repair whereas a smaller change may only be flagged for monitoring or replacement/repair at the next service opportunity.

In various embodiments, the data from the thermal load test is stored on the hardware card (e.g., in memory 115 of hardware card 100). In some embodiments, the thermal load test data may be stored in other components (e.g., management controller 250 or another controller device). The data can then be accessed and analyzed during subsequent operation of the hardware card. For example, stored data from an earlier thermal load test can be compared to current thermal load test data to assess changes in the thermal performance of the hardware card. Analysis of prior data stored on the hardware card (or elsewhere) may provide more accurate assessment of the thermal performance of the hardware card.

According to some embodiments, thermal load testing may be done during production or vetting of the hardware cards (e.g., before deployment to data centers or other customer facing positions). Thermal load testing during this time may provide benchmark (e.g., baseline) operation properties for the hardware card. In certain embodiments, the maximum load steady state temperature (e.g., maximum operation temperature) and the transient thermal temperature property are determined from the thermal load test and stored in the hardware card (e.g., in memory 115). In certain embodiments, these properties are persistently stored in the memory of the hardware card for access at any stage of operation by a component on the hardware card (e.g., microcontroller 110 or SoC 120). For example, these properties may be stored as a predetermined temperature profile in the hardware card.

In various embodiments, the predetermined temperature profile (e.g., the thermal load test determined properties of maximum operation temperature and transient temperature) is accessed by the hardware card (e.g., microcontroller 110 or SoC 120) to improve performance of the hardware card and the server system by compensating for changes in thermal properties (e.g., thermal degradation) of the hardware card. For example, the properties from the thermal load test of the hardware card may be mapped to a thermal operating point of the hardware card (e.g., the card steady state temperature during idle operation). During in service operation of the hardware card, the hardware card may adjust the operating point temperature the card reports to a fan speed controller (e.g., fan speed controller 252) to compensate for thermal degradation of the hardware card. For instance, in certain embodiments, the hardware card may measure current values of temperature and transient thermal properties of the card and compare these values to the stored (persistent) baseline/benchmark values. From this comparison, the thermal operating point of the hardware card can be adjusted to compensate for any thermal degradation of the hardware card.

Figure 5:
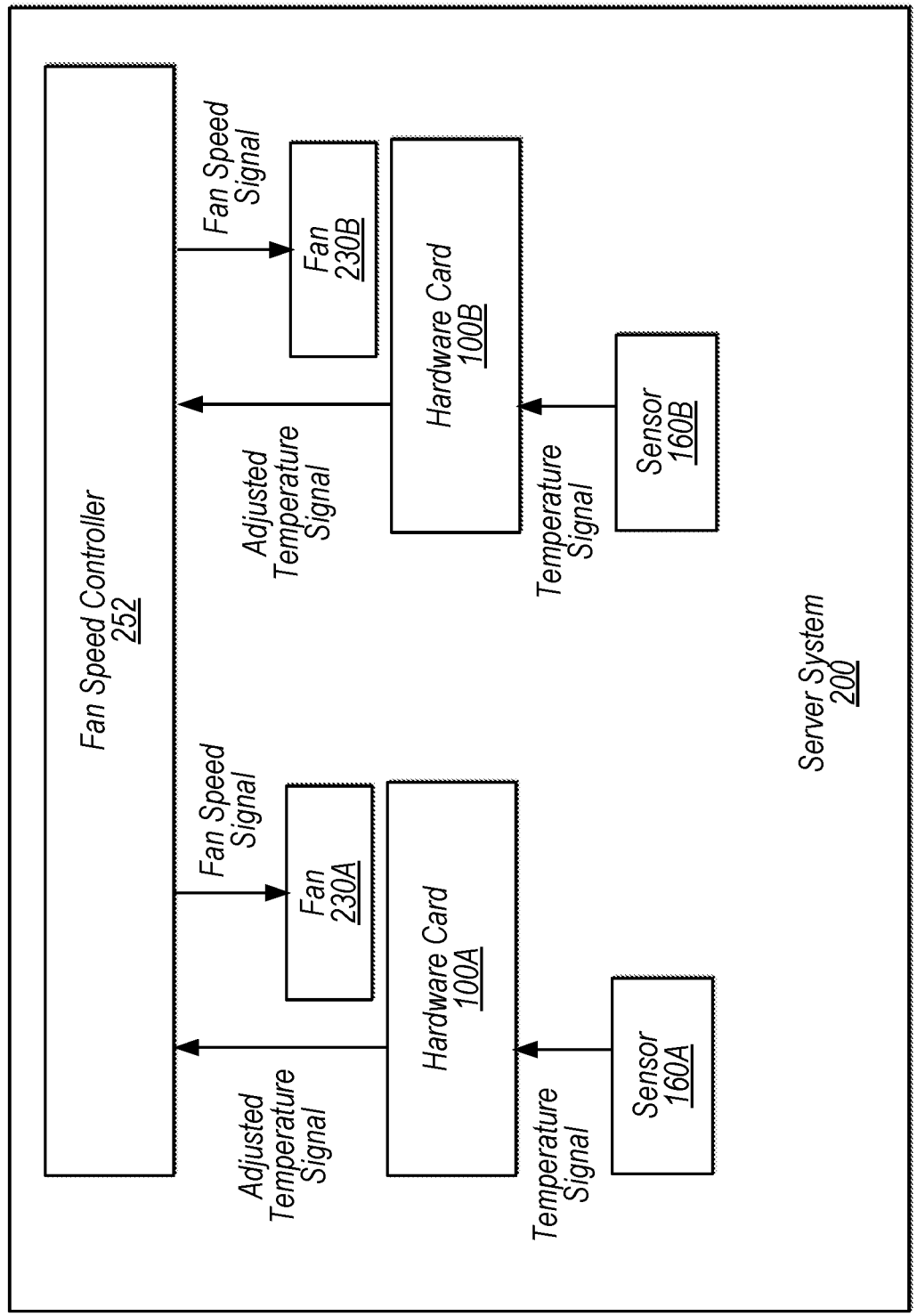
FIG. 5 depicts a block diagram of a server system implementing hardware card thermal degradation compensation for cooling control (e.g., fan speed control), according to some embodiments.

FIG. 5 depicts a block diagram of a server system implementing hardware card thermal degradation compensation for cooling control (e.g., fan speed control), according to some embodiments. In the illustrated embodiment, server system 200 includes fan speed controller 252 and hardware cards 100A, 100B. As described above, fan speed controller 252 may be implemented in a baseboard management controller (such as management controller 250). Fan speed controller 252 may, however, be implemented elsewhere in server system 200. While any number of hardware cards may be implemented in server system 200, as described above, two hardware cards 100A, 100B are depicted in FIG. 5 for simplicity in the drawing.

As shown in the illustrated embodiment, hardware card 100A receives a temperature signal from sensor 160A that is specific to hardware card 100A. Sensor 160A may be, for example, a temperature sensor mounted on hardware card 100A or otherwise positioned to detect a temperature of the hardware card. Similarly, hardware card 100B receives a temperature signal from sensor 160B that is specific to hardware card 100B. In certain embodiments, hardware cards 100A, 100B sample the temperature signal from sensors 160A, 160B, respectively, at specified intervals. For example, the temperature signal may be sampled at intervals of 1 second. The sampling interval for the temperature signal may be handled by the hardware cards themselves. Accordingly, fan speed controller 252 has no awareness or control over the sampling of temperature by the hardware cards 100A, 100B.

Additionally, sampling the temperature at periodic intervals allows the hardware card to determine the transient temperature (e.g., temperature changes in ° C. per second) for the hardware card along with actual temperature at that point in time. Receiving the temperature signal and the determination of the transient thermal property may be handled by any of the components or combination of components on the hardware card. For example, as shown in FIG. 1, hardware card 100 includes hardware microcontroller 110 and SoC 120. In some embodiments, SoC 120 receives the temperature signal from sensor 160 and hardware microcontroller 110 extracts the temperatures from the SoC. Hardware microcontroller 110 may then determine the transient thermal property of hardware card 100 and make any adjustments to a temperature signal output to fan speed controller 252 (shown in FIG. 5). While in this described embodiment, hardware microcontroller 110 receives temperatures and makes adjustments to the temperature signal output by hardware card 100, any various components including SoC 120 or other controllers on the hardware card, alone or in combination, may receive the temperature signals and output a temperature signal to the fan speed controller. Thus, the following description generally describes the hardware card receiving the temperature signals from the sensors and making adjustments to the temperature signal provided to the fan speed controller with the understanding that any various combination of components on the hardware card may implement these operations.

Turning again to FIG. 5, in certain embodiments, a hardware card (e.g., hardware card 100A or hardware card 100B) determines an adjusted temperature signal based on the transient thermal temperature property and the temperature values in the temperature signals received from its sensors (e.g., sensors 160A or sensors 160B). In certain embodiments, the hardware card adjusts the temperature in the temperature signal based on a comparison to the predetermined temperature profile (e.g., the baseline/benchmark values of transient thermal properties and maximum operating temperature) stored in its memory (e.g., memory 115, shown in FIG. 1). This comparison of current values to stored (persistent) values allows the hardware card to compensate for thermal degradation of the card as determined from differences between the current values and the stored values. Compensation may include, for instance, adjusting the temperature (e.g., the operating temperature) provided to fan speed controller 252 to "trick" the fan speed controller into providing more cooling for the hardware card by increasing the fan speed in the fan speed signal provided to the fan for the hardware card (e.g., fan 230A for hardware card 100A or fan 230B for hardware card 100B).

Figure 6:
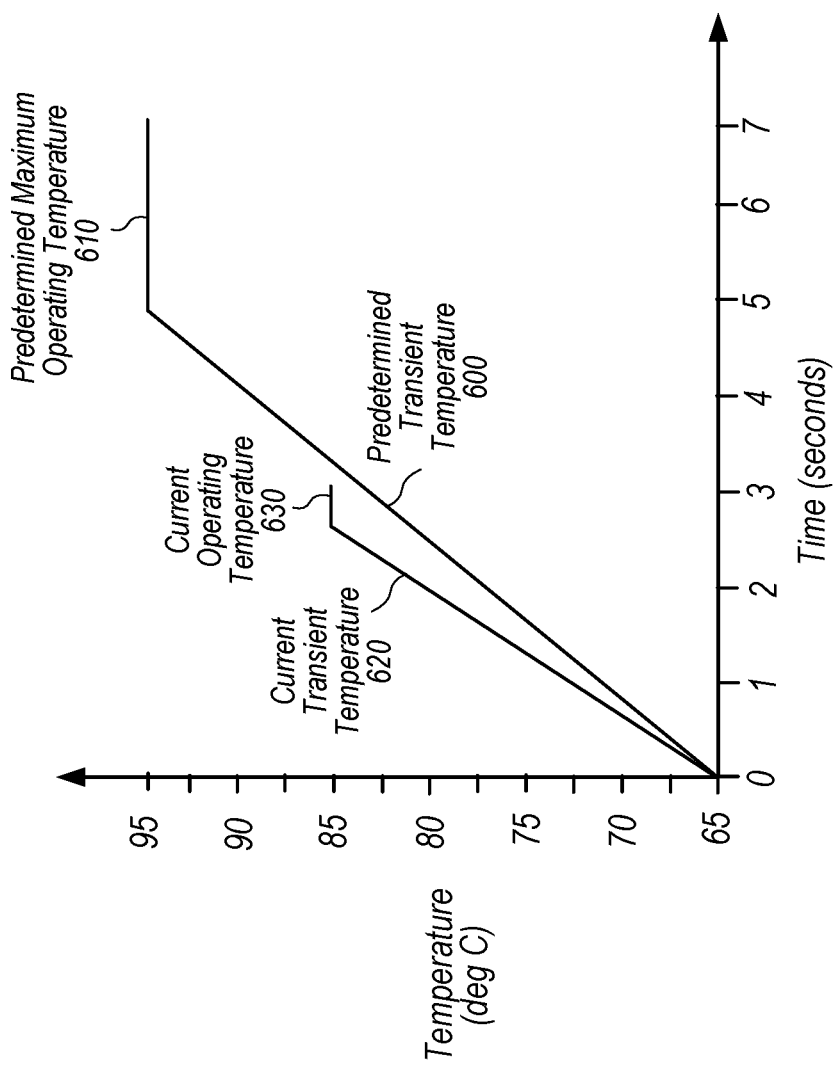
FIG. 6 depicts an example plot of a temperature versus time comparison of a current operating temperature profile and a predetermined temperature profile.

FIG. 6 depicts an example plot of a temperature versus time comparison of a current operating temperature profile and a predetermined temperature profile. In the example, the predetermined temperature profile (e.g., the baseline/benchmark properties) for a hardware card includes a value of 6° C./second for the predetermined transient temperature 600 and a predetermined maximum operating temperature 610 of 95° C. The baseline/benchmark values may operate as thresholds for thermal degradation of the hardware card. For instance, if the transient thermal temperature or the operating temperature of the hardware card during service are determined to be above the baseline/benchmark values, the hardware card may be considered to be thermally degrading and the hardware card will adjust its output temperature according to the differences between the transient thermal temperature or the operating temperature of the hardware card and the baseline/benchmark values.

Further in the example, during in service operation of the card, the hardware card may determine a current transient temperature 620 with a value of 8° C./second and a current operating temperature 630 with a value of 85° C. It should be noted that the current operating temperature 630 is typically measured as an instantaneous value and that the operating temperature may, in actuality, still be increasing at the time of measurement (for instance, due to rapid thermal degradation, the temperature may continue to increase steadily).

Based on the value of the transient temperature 620 being above the stored predetermined transient temperature value 600, the hardware card may determine that thermal degradation is occurring and that more cooling of the hardware card is needed. Accordingly, to compensate for the thermal degradation, the hardware card may adjust the temperature reported to the fan speed controller based on the difference in baseline transient thermal temperature and measured transient thermal temperature as well as the difference between current operating temperature 630 and predetermined maximum operating temperature 610. For instance, instead of reporting the current operating temperature 630 with a value of 85° C. as the operating temperature to the fan speed controller, the hardware card may report an operating temperature with a value of 87° C. It should also be noted that the adjustment to the operating temperature may be made on various characteristics of the hardware card and not solely on the measured temperature or measured transient temperature property. For example, the operating temperature adjustment may be made based on the current temperature properties (both current operating temperature and current transient temperature) along with additional characteristics such as, but not limited to, expected fan speed increase provided by reported temperature or expected cooling of hardware card that corresponds to an expected fan speed.

When fan speed controller 252, shown in FIG. 5, receives the operating temperature, the fan speed controller may then adjust the fan speed (via the fan speed signal shown) for the hardware card based on the higher operating temperature reported by the hardware card. Fan speed controller 252 does not, however, receive any information on adjustments in the operating temperature made by the hardware card. In various embodiments, the fan speed signal is a periodic pulse control signal sent to the fan (e.g., fan 230A or fan 230B). For example, the fan speed signal may be a periodic electric signal with a duty cycle that translates to a specified fan speed when received by the fan. Fan speed controller 252 may generate the periodic electric signal to provide the specified fan speed based on the temperature received by the fan speed controller.

In certain embodiments, the adjusted temperature output by the hardware cards (e.g., hardware card 100A and hardware card 100B) is in the standard temperature format, described herein. Thus, the temperatures received by fan speed controller 252 are agnostic with respect to the hardware cards and the fan speed controller is unaware of any adjustments made to the reported temperature by the hardware cards.

As shown in FIG. 5, the adjusted temperature signal for hardware card 100A and the fan speed signal to fan 230A are distinct (e.g., separate) from the adjusted temperature signal for hardware card 100B and the fan speed signal to fan 230B. Thus, each hardware card and its associated fans are individually controlled based on the separate, individually determined temperatures provided to fan speed controller 252 by hardware card 100A and hardware card 100B. Determining adjusted temperature (e.g., operating temperature) individually for the hardware cards allows hardware cards to individually report adjusted temperatures based on each card's own determination of the properties of the card. For instance, if only hardware card 100A is subject to thermal degradation, only the temperature reported by hardware card 100A is adjusted based on a comparison to the predetermined temperature profile while hardware card 100B reports a normal (unadjusted) temperature. Having hardware cards individually adjust their operating temperatures allows only the hardware cards that are thermally degrading to compensate by increasing the reported temperature. This individualization of cooling control for the hardware cards provides a more efficient and less costly cooling operation for the server system.

While the embodiment of FIG. 5 depicts individual fans (e.g., fans 230A, 230B) associated with individual hardware cards (e.g., hardware cards 100A, 100B), additional embodiments may be contemplated where a single cooling system (e.g., a single fan or a group of fans) are associated with a group of hardware cards. In such embodiments, the fan speed(s) for the group of hardware cards may be determined based on the worst (e.g., highest) temperature reported by one of the hardware cards in the group. Typically, a group of hardware cards utilizing a single cooling system is small subset of an overall system. Thus, even though fan speed(s) are controlled based on the worst case scenario in a group of hardware cards, controlling fan speeds for small subsets instead of the overall system at large may provide improved cooling efficiency and increased energy savings.

In various embodiments, the hardware card (e.g., hardware card 100A or hardware card 100B) may store the adjusted temperature data and transient temperature data determined by the hardware card and reported to the fan speed controller. In some embodiments, the adjusted temperatures and transient temperature data are stored as differences between the maximum operating temperature (from the thermal load test) and operating temperatures seen during service. By storing the differences over time, the hardware card can assess changes in performance of the hardware card and make determinations based on the assessed changes. For example, if the transient thermal temperature property is continually increasing over time, then a determination may be made that the board is failing quickly and should be replaced as soon as possible since continued increases in cooling are failing from protecting the hardware card from thermal degradation.

In some embodiments, one or more thresholds may be set (e.g., predetermined) for the thermal properties measured by the hardware card (e.g., either transient thermal temperature and/or steady state temperature). For example, for transient thermal temperature, a threshold may be set that if the transient thermal temperature increases above the baseline/benchmark above a certain level, then an alarm may be triggered indicating that the hardware card is degrading and needs to be replaced or repaired. In some embodiments, multiple thresholds may be implemented at different levels. For instance, a first threshold may be a trigger for immediate replacement while a second threshold (lower than the first threshold) may be a trigger to replace the hardware card when possible but not immediately (e.g., when scheduled for next service outage). Additionally, another lower threshold may be implemented where a trigger is initiated that indicates performance of the hardware card should be monitored closely (e.g., the card is just showing signs of thermal degradation).

While embodiments described above have the hardware card determining the adjusted temperature signal provided to the fan speed controller, alternative embodiments may be contemplated where the fan speed controller or the management controller receive the temperature signals from temperature sensors (either directly or through the hardware card) and the adjustments to the operating temperature are made by the fan speed controller or the management controller. For example, the transient thermal properties and maximum operating temperatures for individual hardware cards may be stored in a memory associated with the fan speed controller or the management controller. Accordingly, when the fan speed controller or the management controller receives the temperature signal from a specified hardware card, the fan speed controller or the management controller may look up the transient thermal properties and maximum operating temperatures for the specified hardware card and adjust the operating temperature, which may then be used to determine fan speed or make other determinations on the operation of the hardware card.

Figure 7:
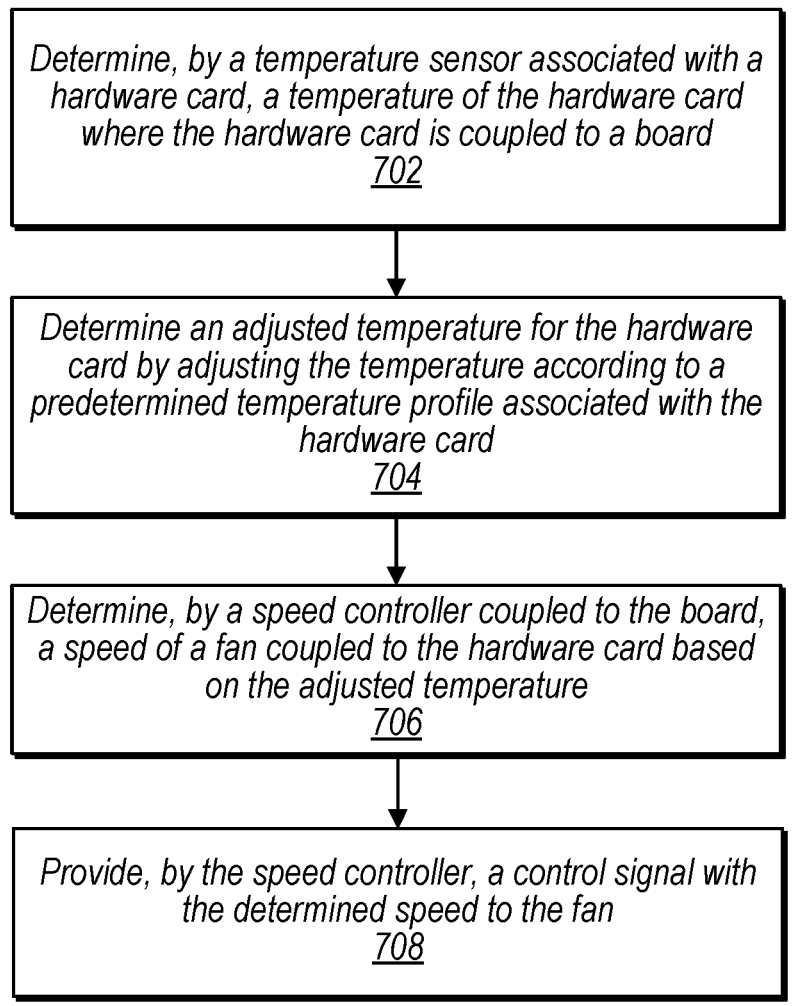
FIG. 7 is a flow diagram illustrating a method for controlling fan speed, according to some embodiments.

FIG. 7 is a flow diagram illustrating a method for controlling fan speed, according to some embodiments.

At 702, in the illustrated embodiment, a temperature of a hardware card coupled to a board is determined by a temperature sensor associated with the hardware card.

At 704, in the illustrated embodiment, an adjusted temperature for the hardware card is determined by adjusting the temperature according to a predetermined temperature profile associated with the hardware card. In some embodiments, the predetermined temperature profile is determined based on thermal transient and maximum temperature reached values for the hardware card during testing of the hardware card.

In some embodiments, the adjusted temperature is determined by adjusting the temperature according to the predetermined temperature profile stored in the hardware card. In some embodiments, the adjusted temperature is determined by adjusting the temperature according to the predetermined temperature profile associated with the hardware card that is stored in a management controller coupled to the board, the speed controller being located on the management controller. In some embodiments, the management controller stores predetermined temperature profiles for multiple hardware cards, each hardware card having an individual predetermined temperature profile associated with the hardware card.

At 706, in the illustrated embodiment, a speed of a fan coupled to the hardware card is determined based on the adjusted temperature by a speed controller coupled to the board.

At 708, in the illustrated embodiment, a control signal with the determined speed is provided to the fan by the speed controller.

Figure 8:
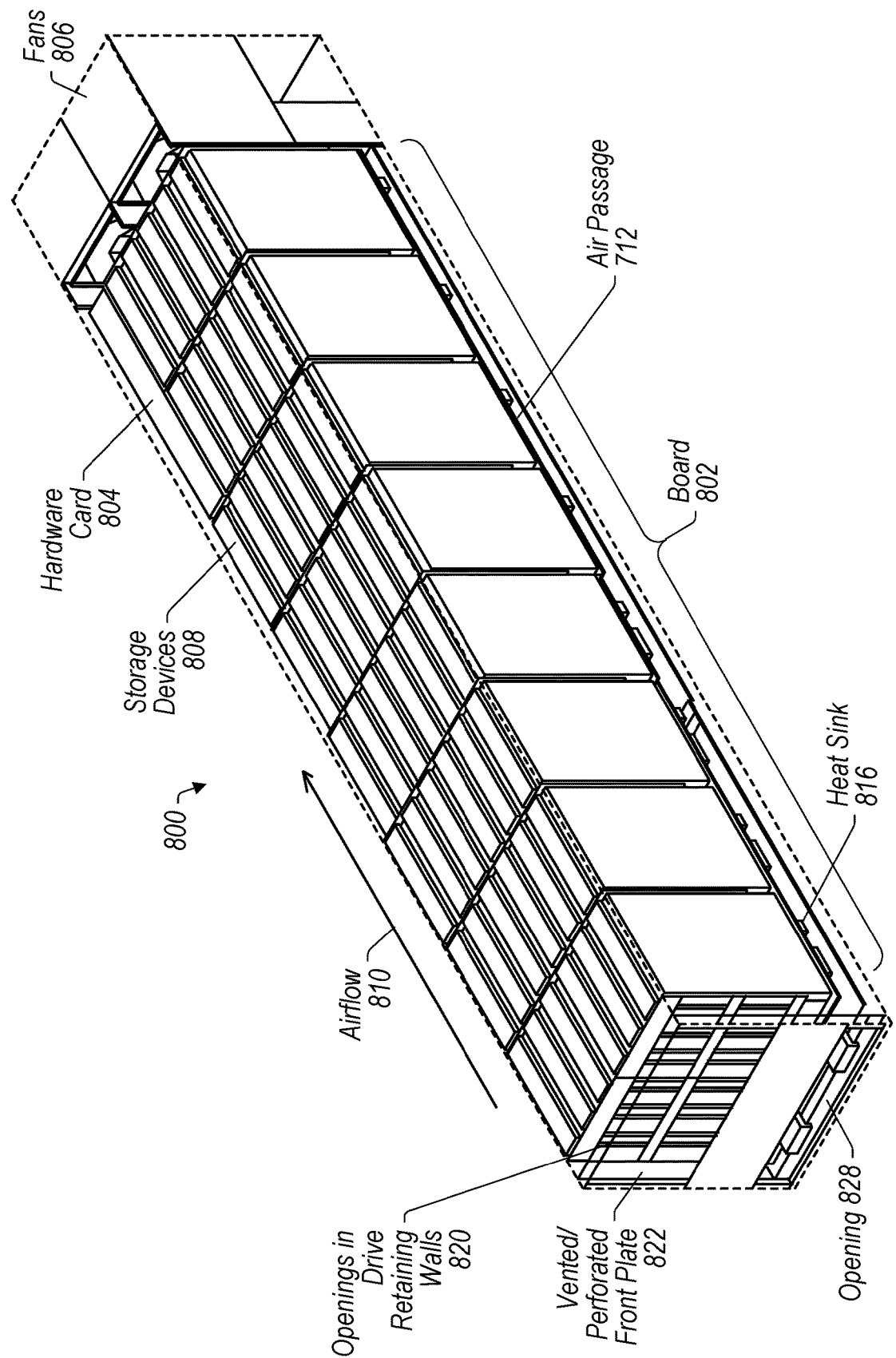
FIG. 8 is a perspective view of an embodiment of a data storage system, according to some embodiments.

FIG. 8 is a perspective view of an example of a data storage system, according to some embodiments. Data Storage system 800 includes board 802 (e.g., a motherboard or a backplane). System 800 further includes hardware card 804 and storage devices 808. Hardware card 804 may be, for example, a network interface card or other hardware card described herein. In various embodiments, fans 806 are mounted in a chassis with system 800 and pull air through the system according to air flow direction 810 which may be from front to back of the board 802.

In some embodiments, system 800 includes a vented/perforated front plate 822 (a portion of which is shown in FIG. 8) that allows air to flow into the system 800. Also, in some embodiments, the chassis of the data storage system includes drive retaining walls that include openings 820 that enable air to flow between storage devices 808 and across hardware card 804 in direction 810. Also, in various embodiments, front plate 822 includes an opening 828 that enables air to be drawn into air passage 812 and flow underneath storage devices 808 and hardware card 804 as well as across heat sinks 816.

Figure 9:
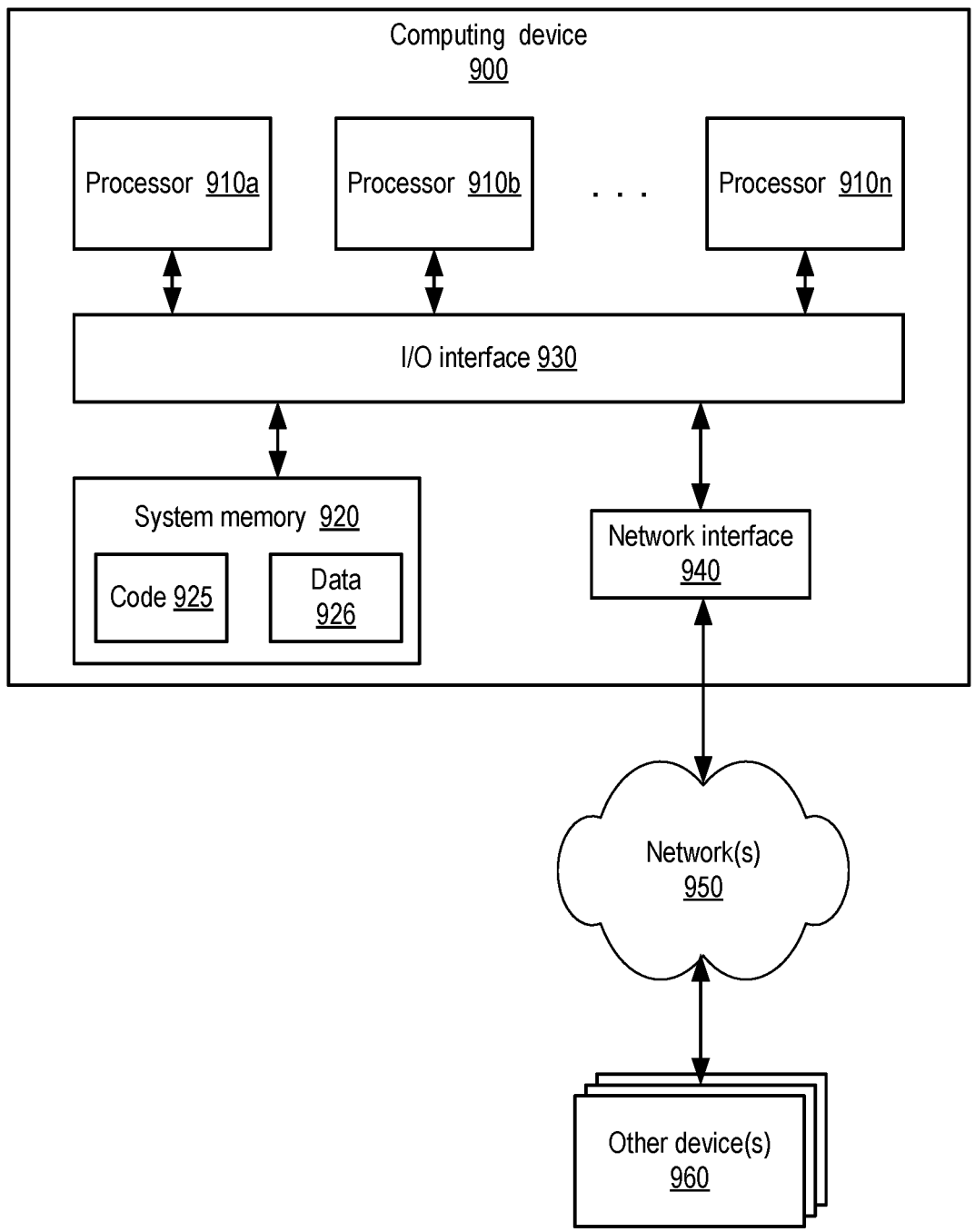
FIG. 9 is a block diagram illustrating an example computing device that may be used in at least some embodiments.

FIG. 9 is a block diagram illustrating an example computing device that may be used in at least some embodiments.

FIG. 9 illustrates such a general-purpose computing device 900 as may be used in any of the embodiments described herein. In the illustrated embodiment, computing device 900 includes one or more processors 910 coupled to a system memory 920 (which may comprise both non-volatile and volatile memory modules) via an input/output (I/O) interface 930. Computing device 900 further includes a network interface 940 coupled to I/O interface 930.

In various embodiments, computing device 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA. In some implementations, graphics processing units (GPUs) may be used instead of, or in addition to, conventional processors.

System memory 920 may be configured to store instructions and data accessible by processor(s) 910. In at least some embodiments, the system memory 920 may comprise both volatile and non-volatile portions; in other embodiments, only volatile memory may be used. In various embodiments, the volatile portion of system memory 920 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 920 as code 925 and data 926.

In some embodiments, I/O interface 930 may be configured to coordinate I/O traffic between processor 910, system memory 920, and any peripheral devices in the device, including network interface 940 or other peripheral interfaces such as various types of persistent and/or volatile storage devices. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computing device 900 and other devices 960 attached to a network or networks 950, such as other computer systems or devices as illustrated in FIGS. 1-4, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may represent one embodiment of a computer-accessible medium configured to store at least a subset of program instructions and data used for implementing the methods and apparatus discussed in the context of FIGS. 1-4. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 900 via I/O interface 930. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 900 as system memory 920 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 940. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent example embodiments of methods. The methods may be implemented in software, hardware, or a combination thereof. The order of method may be changed, and various elements may be added, reordered, combined, omitted, modified, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A server system, comprising:
a motherboard;
a hardware card coupled to the motherboard, the hardware card including a temperature sensor, wherein the hardware card is configured to output an adjusted temperature in a standard temperature format, the adjusted temperature being determined by adjusting, according to a predetermined temperature profile stored on the hardware card, a temperature sensed by the temperature sensor;
a fan configured to provide airflow to the hardware card; and
a management controller coupled to the motherboard, wherein the management controller includes a speed controller for the fan, the speed controller being configured to determine a fan speed based on the adjusted temperature in the standard temperature format received from the hardware card.

2. The system of claim 1, further comprising a second hardware card configured to be coupled to the motherboard, the second hardware card including a second temperature sensor, wherein the second hardware card is configured to output a second adjusted temperature in the standard temperature format, the second adjusted temperature being based on a temperature sensed by the second temperature sensor adjusted according to a second predetermined temperature profile stored on the second hardware card, and wherein the speed controller is configured to determine a speed of the fan based on the second adjusted temperature in the standard temperature format received from the second hardware card.

3. The system of claim 1, wherein the hardware card is configured to output the adjusted temperature at predetermined time intervals, and wherein the speed controller is configured to determine the fan speed in response to receiving the adjusted temperature from the hardware card.

4. The system of claim 1, wherein the hardware card is configured to output the adjusted temperature when a temperature profile determined from the temperature sensed by the temperature sensor satisfies a threshold for thermal degradation of the hardware card.

5. The system of claim 1, wherein the motherboard includes an interface element, and wherein the hardware card is configured to couple to the motherboard at the interface element.

6. A hardware card system, comprising:
a hardware card configured to be coupled to a board, wherein the hardware card is configured to output an adjusted operating temperature of the hardware card, wherein the adjusted operating temperature output by the hardware card is based on a temperature sensed by a temperature sensor associated with the hardware card adjusted according to a predetermined operating temperature profile stored on the hardware card.

7. The system of claim 6, wherein the hardware card is configured to output the adjusted operating temperature in an agnostic temperature format to the board configured to be coupled to the hardware card.

8. The system of claim 6, wherein the predetermined temperature profile includes a maximum operating temperature and a transient temperature property of the hardware card.

9. The system of claim 6, wherein the hardware card determines a current temperature profile based on the temperature of the hardware card sensed by the temperature sensor, and wherein the hardware card is configured to adjust the temperature output based on a comparison of the current temperature profile to the predetermined temperature profile.

10. The system of claim 9, wherein the current temperature profile includes an instantaneous temperature of the hardware card and a transient temperature property of the hardware card measured over a specified time period.

11. The system of claim 6, wherein the hardware card is configured to output an adjusted operating parameter of the hardware card in addition to the adjusted operating temperature, wherein the adjusted operating parameter output by the hardware card is a voltage or a power associated with the hardware card adjusted according to a predetermined operating parameter profile stored on the hardware card.

12. The system of claim 11, further comprising a fan configured to provide cooling airflow to the hardware card, wherein a speed of the fan is controlled based on the adjusted operating parameter output by the hardware card.

13. The system of claim 6, wherein the board the hardware card is configured to be coupled to is a motherboard or a backplane for a storage server system.

14. The system of claim 6, wherein the hardware card is a virtualization offloading card that performs virtualization tasks for computing instances implemented using processors coupled to the board.

15. The system of claim 6, wherein the hardware card is configured to determine the adjusted operating temperature at predetermined time intervals, and wherein the hardware card is configured to store values of the adjusted operating temperature determined at the predetermined time intervals, and wherein the hardware card is configured to output an alarm signal when the adjusted operating temperature fails to satisfy a predetermined threshold for a predetermined number of intervals.

16. A method, comprising:
determining, by a temperature sensor associated with a hardware card, a temperature of the hardware card, wherein the hardware card is coupled to a board;
determining an adjusted temperature for the hardware card by adjusting the temperature according to a predetermined temperature profile associated with the hardware card;
determining, by a speed controller coupled to the board, a speed of a fan providing airflow to the hardware card based on the adjusted temperature; and
providing, by the speed controller, a control signal based on the determined speed to the fan.

17. The method of claim 16, wherein the adjusted temperature is determined by adjusting the temperature determined by the temperature sensor according to the predetermined temperature profile stored in the hardware card.

18. The method of claim 16, wherein the adjusted temperature is determined by adjusting the temperature determined by the temperature sensor according to the predetermined temperature profile associated with the hardware card that is stored in a management controller coupled to the board, the speed controller being located on the management controller.

19. The method of claim 18, wherein the management controller stores predetermined temperature profiles for multiple hardware cards, each hardware card having an individual predetermined temperature profile associated with the hardware card.

20. The method of claim 16, further comprising determining the predetermined temperature profile based on transient temperature properties and maximum temperature reached values for the hardware card during testing of the hardware card.

* * * * *